United States Patent [19]

Engel et al.

[11] Patent Number: 5,146,319
[45] Date of Patent: Sep. 8, 1992

[54] DIGITAL LUMINANCE SIGNAL TRANSIENT IMPROVER AND PEAKER

[75] Inventors: Christopher M. Engel; Khosro M. Rabii, both of Arlington Heights, Ill.

[73] Assignee: Zenith Electronics Corporation, Glenview, Ill.

[21] Appl. No.: 379,510

[22] Filed: Jul. 13, 1989

[51] Int. Cl.⁵ .......................... H04N 5/14; H04N 9/64
[52] U.S. Cl. .......................... 358/39; 358/37; 358/106
[58] Field of Search .............. 358/39, 38, 37, 166, 358/167, 35, 36, 31, 40

[56] References Cited

U.S. PATENT DOCUMENTS 4,030,121  6/1977  Faroudja .
4,603,353  7/1986  Henson ........................... 358/39
4,623,924  11/1986  Wargo et al. .................... 358/39

Primary Examiner—Howard W. Britton
Assistant Examiner—Michael Lee

[57] ABSTRACT

A luminance signal transient improver and non-linear peaking arrangement processes a digital luminance signal by generating a first difference signal and a second difference signal and developing therefrom a threshold control signal, a high frequency peaking signal and a low frequency peaking signal. The high frequency peaking signal consists of the second difference signal as modified by a high pass filter and the threshold control signal consists of the second difference signal as modified by a threshold circuit. The first difference signal is passed through an absolute value circuit and a low frequency emphasis circuit and modified by the threshold control signal and added to the high frequency peaking signal. The combined result is subjected to non-linear filtering and added to the luminance signal to form a horizontally processed luminance signal. A comb filter develops a vertical detail component representing differences between successive lines of luminance and combines the vertical detail component with the luminance signal to form a vertically processed luminance signal which is combined with the horizontally processed luminance signal to develop a fully processed luminance signal.

8 Claims, 4 Drawing Sheets 5,146,319

DIGITAL LUMINANCE SIGNAL TRANSIENT IMPROVER AND PEAKER

BACKGROUND OF THE INVENTION AND PRIOR ART

This invention relates generally to digital television systems and specifically to an arrangement for improving the luminance signal transient response characteristics and peaking of a digital television receiver.

A digital television receiver described in the ITT publication entitled "Digit 2000-DSLI Digital TV System," which is incorporated by reference herein, describes a digital color television receiver arrangement having a microprocessor that controls a plurality of function control modules over a so-called IM (Intermetall) bus. The luminance signal processing system of the present invention may be utilized with a television receiver constructed in accordance with the above-mentioned publication.

The art has circuits illustrating transient improvement of video signals to compensate for the effects of limited band-width and the like. In U.S. Pat. No. 4,030,121, issued Jun. 14, 1977, a "video crispener" is disclosed for improving the transient response of vide signals. That system developed first and second differentials of an analog input video signal and processing the first differential through a full wave rectifier and the second differential through a limiting amplifier. The products of the rectifier and limiting amplifier were multiplied and added back to the suitably delayed input video signal. Other variants on the above method were also disclosed. The inventive arrangement of the patent, to Applicants' knowledge has never been implemented in video apparatus.

Peaking of video signals has long been done in television receivers in an attempt to enhance the video display by emphasizing certain frequencies of the video signal. Peaking is arbitrary and is based upon subjective criteria as to what constitutes an optimized display. Conventional analog signal peaking techniques are not useful with digital signals however.

The present invention describes apparatus for processing a digitized luminance signal to accentuate or improve transients in the signal and to selectively and variably peak the signal to emphasize low and high frequencies while controlling undershoot and overshoot of the signal. In accordance with the preferred form of the invention, the various parameters for controlling the amount of peaking and transient improvement are factory settings which may be accomplished in software.

Objects of the Invention

A principal object of the invention is to provide a novel means for improving a digitized luminance signal.

Another object of the invention is to provide an improved digital luminance signal processing system.

A further object of the invention is to provide a novel digital luminance signal processing system having readily controllable characteristics.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
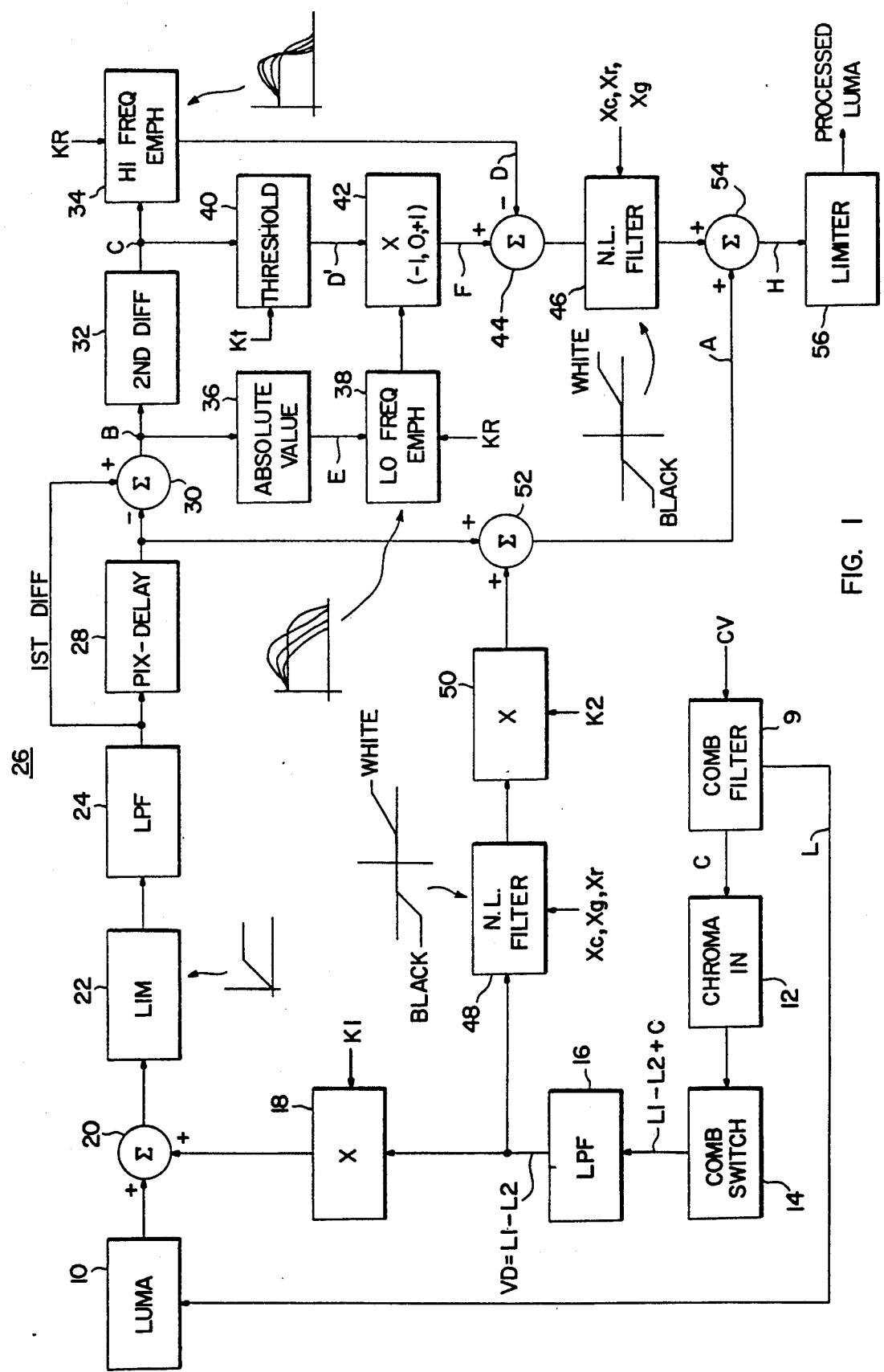
FIG. 1 is a luminance signal processor constructed in accordance with the invention.

In FIG. 1, a source of digital luminance signal 10 and a source of digital chrominance signal 12 are provided. The luminance and chrominance signals, sometimes referred to herein as luma and chroma, are related to each other and together define a complete color video signal. The luma and chroma signals may be developed via a comb filter 9 from a composite video signal CV. Chroma signal from source 12 is supplied to a comb switch 14 which either produces an output of C (chrominance) and the difference between successive lines of luminance L1-L2 or zero (if no comb filter is used). Since a comb filter combines successive pairs of horizontal lines of video to generate the related chroma and luma components, the chroma component can be used to develop a vertical detail component VD that is representative of the difference in luminance between the successive horizontal lines. When simple decoding of a signal is desired, comb filter 9 is not used and comb switch 14 is turned off to produce a zero output. In that event the luminance signal applied to luma circuit 10 would be developed by other means (not shown).

The output of comb switch 14 is supplied to a low pass filter 16, which is a very sharp digital filter, that permits only the low frequency vertical detail component VD to pass. Any chroma signal is blocked. Low pass filter 16 in turn supplies a multiplier 18 that, as indicated, has its multiplication effect varied in accordance with a programmable factor K1, which is microprocessor adjustable. Thus the effect of VD may be varied. The output of multiplier 18 is coupled to a positive input of a summer 20 along with the input from luma source 10. The output of summer 20 is coupled to a digital limiter 22 which, for example, may have an operating range of 0 to 255 for an eight bit system. Limiter 22 is coupled to another low pass filter 24 that has a cutoff of about 7.2 MHz for passing the full luma signal. Low pass filter 24 in turn is coupled to a first difference circuit 26 that comprises a one-pixel delay circuit 28 coupled to the negative input of a summer 30, the positive input of which is supplied with the luma signal from low pass filter 24. The result is that the direct signal and the delayed signal are subtracted from each other to produce a first difference signal. Summer 30 in turn is coupled to a second difference circuit 32 and to an absolute value circuit 36. Absolute value circuit 36 derives a signal which is the absolute value of the first difference signal and applies it a low frequency emphasis circuit 38 which provides a low frequency peaking signal in accordance with a programmable factor Kr. The low frequency range is the lower half of the active spectrum of the luma signal being processed.

The output of second difference circuit 32 is supplied to a high frequency emphasis circuit 34 which is also controllable by programmable factor Kr for providing a high frequency peaking signal. The high frequency range is the upper half of the active spectrum of the luma signal being processed. The second difference signal is also supplied to a relative threshold detector 40 in which the threshold is controllable by a programmable factor Kt for developing a threshold circuit control signal in response to the second difference signal.

Figure 3:
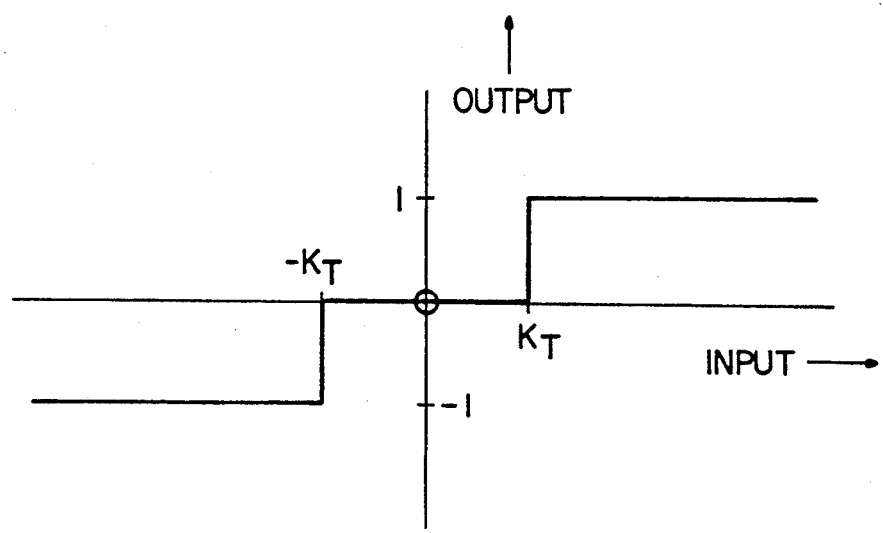
FIG. 3 illustrates operation of the threshold detector.
Figure 4A:
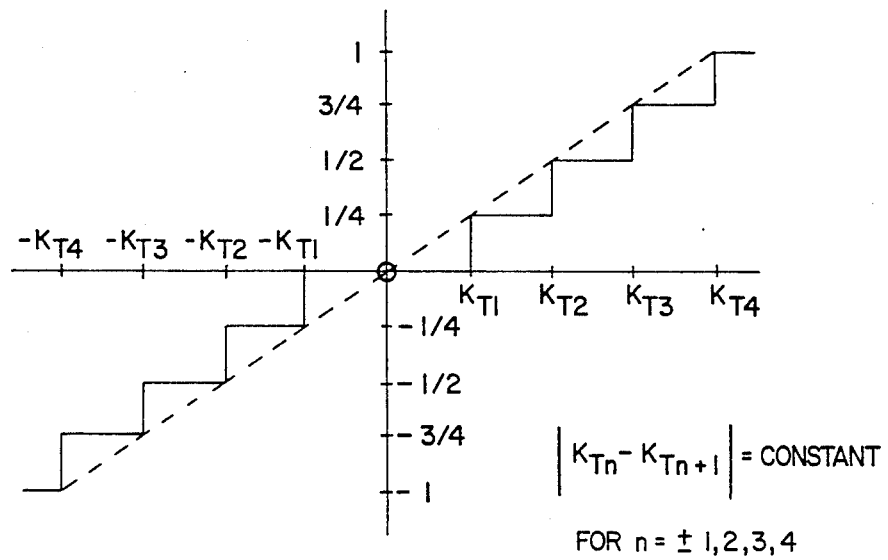
FIGS. 4A and 4B illustrate different types of threshold detector operation.
Figure 4B:
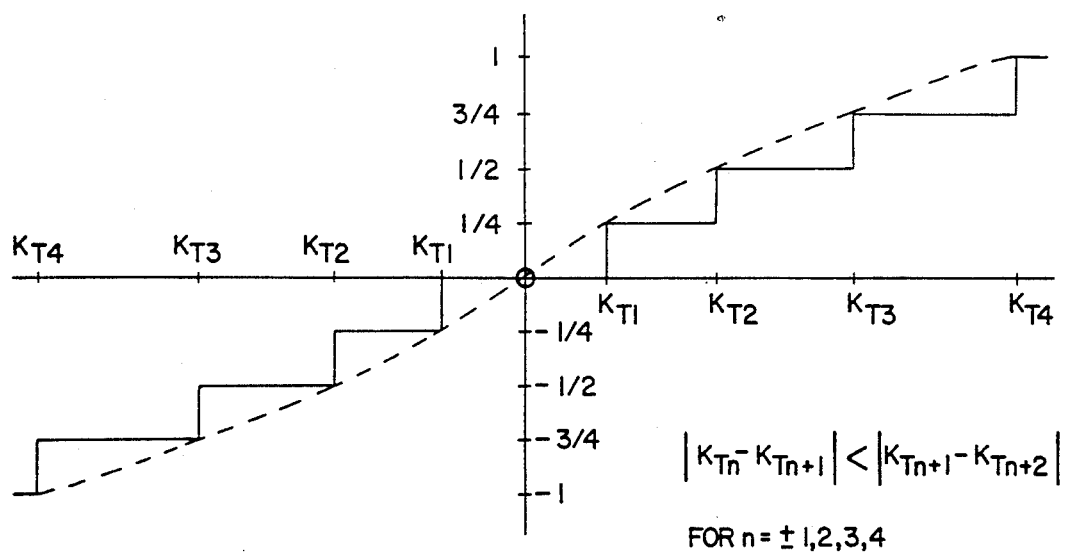

The operation of the threshold detector is illustrated in FIG. 3. For values of the second difference signal greater than Kt, a "+1" output is produced, for values less than Kt a "−1" output is produced and for all other values a "0" output is produced. More complex waveform shaping can be achieved by using segmented threshold detectors as shown in FIGS. 4A and 4B.

Figure 5:
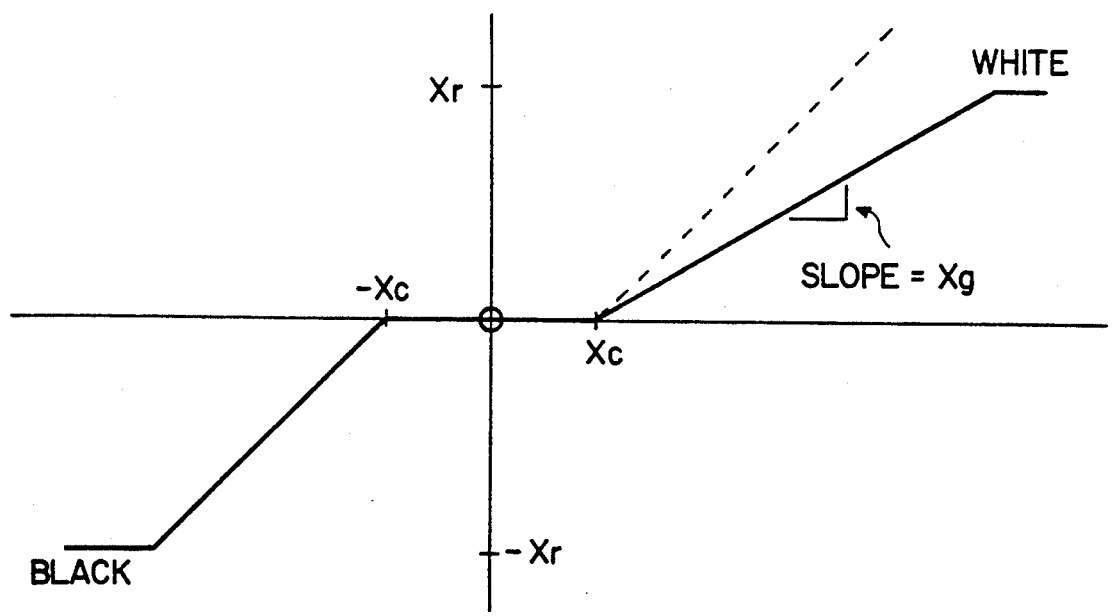
FIG. 5 shows the response characteristic of the nonlinear filters used in the invention.

The output of the relative threshold detector 40 is coupled to a multiplier circuit 42 that is also supplied with the output of low frequency emphasis circuit 38. Multiplier 42 selectively multiplies the low frequency emphasized derived signal by the threshold circuit control signal, i.e. −1, 0 or +1 as indicated. Multiplier 42 in turn supplies a transient improved component, which includes a low frequency peaking component to a positive input of a summer 44 which has a negative input that is supplied with the high frequency peaking component from high frequency emphasis circuit 34. The output of summer 44 is supplied to a non-linear filter 46 that also asymmetrically limits the signal. Non-linear filter 46 is controlled by three programmable factors Xc, Xg and XR, as shown in FIG. 5.

Reverting back to low pass filter 16, vertical detail VD is also coupled to a similar non-linear filter 48 where it is asymmetrically limited by filter 48 which is controllable by the same factors Sc, Xg and XR. The output of filter 48 is coupled to a multiplier 50 that is controllable by a programmable factor K2 that, in turn, supplies a positive input of a summer 52. Another positive input of summer 52 is supplied with the original luminance signal (and the multiplied VD component previously added thereto in summer 20) from the junction of one-pixel delay 28 and summer 30. The output of summer 52 consists of a vertically processed luminance signal and is coupled to a positive input of a summer 54 which has another positive input supplied with the output of filter 46 which is a horizontally processed luminance signal. The output of summer 54 is supplied to another symmetrical limiter 56 which produces the fully processed luminance signal, i.e., it is both horizontally and vertically processed.

The various waveforms A-H illustrated about FIG. 1 depict the characteristics of the corresponding individual processing circuits. Low frequency emphasis circuit 38 is shown with a series of curves to generally illustrate the range of different response characteristics available. Similarly, high frequency emphasis circuit 34 illustrates the range of peaking for the high frequencies. The non-linear filters 46 and 48 have substantially the same response characteristics and asymmetrically limit the signals, i.e., the black signal level extends farther than the white signal level, thus creating more undershoots than overshoots. (See FIG. 5.) The extended zero level portion (the "coring range" from −Xc to +Xc) indicates areas where no enhancement is provided for reducing the impression of low level noise.

Figure 2:
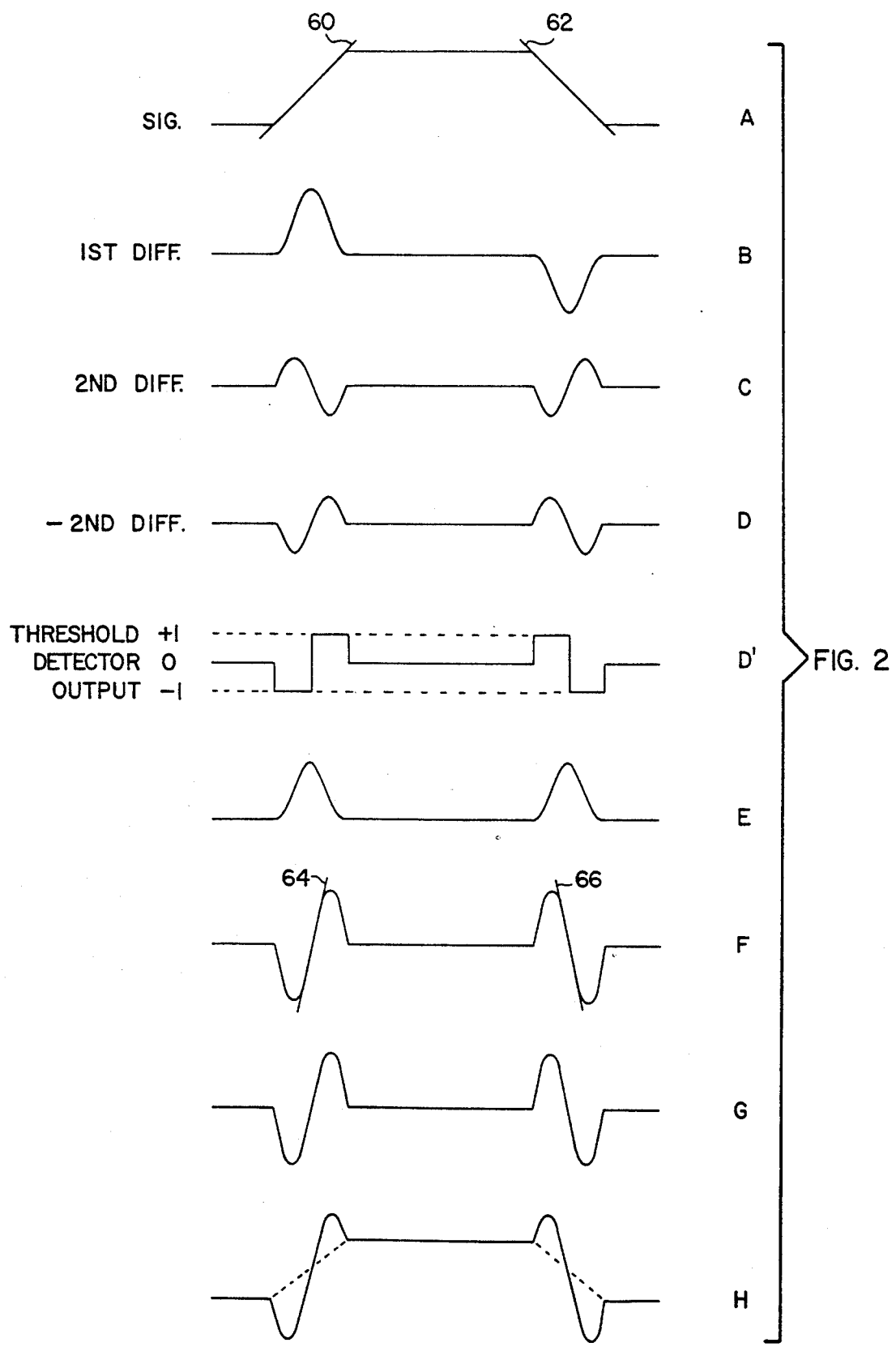
FIG. 2 is a series of idealized waveforms illustrating an aspect of the inventive process.

Reference to FIG. 2 will illustrate, in analog form, the manner in which the inventive luminance signal processor provides peaking and transient improvement. Waveform A generally depicts a luma signal (that may have a VD component added to it) at the input of summer 30. Waveform B represents the first difference signal at the output of summer 30 which, in accordance with the invention, is accomplished by subtracting one pixel value from the immediately preceding pixel value. Waveform C, which is developed at the output of second difference circuit 32, is the result of taking a second difference signal, that is, subtracting two first difference signals. In practice this is accomplished by subtracting the two first difference pixel values from each other. Waveform D is the negative of waveform C or an inverted second difference signal (without the effect of high frequency emphasis circuit 34) and waveform E represents the absolute value of the first difference signal (waveform B). Waveform D' represents the threshold circuit control signal of the output of threshold detector 40. Waveform F is the result of multiplying waveforms D' and E without the effect of low frequency emphasis circuit 38. Waveform F represents the transient improved component (with low frequency peaking but without high order frequency emphasis developed at the output of multiplier 42). Waveforms F and D are summed in summer 44 to produce waveform G, which is processed by non-linear filter 46 to develop the horizontally processed luminance signal and then added to waveform A in summer 54 to produce output waveform H. The slopes of waveform A (illustrated by 60 and 62) are seen to be much less steep than those shown by 64 and 66 in waveform F and the corresponding slopes in waveforms G and H. (It should be noted that if VD is present, it will be reflected in waveform A both through the luma signal via multiplier 18 and through multiplier 50). This represents the total transient improvement that is obtained with the system of the invention, i.e. both vertical and horizontal improvement.

As mentioned previously, signal enhancement, both in terms of transient improvement and signal peaking, is subjective. Consequently, with the system of the invention independently controllable criteria are provided to enable the manufacturer to set up a color television receiver to optimize the video display. Non-linear peaking, for example, is highly dependent upon the particular non-linear property (gamma characteristic) of the cathode ray tube employed. The maximum or peak white level signal that may be accommodated, as well as the cutoff characteristic of the tube, all need to be accommodated.

Operationally, the input luma signal is subjected to limiting via digital limiter 22 and first difference and second difference signals are derived. The first difference signal is applied to absolute value determining circuit 36 and subsequently applied to the lower half of the active spectrum emphasis circuit 38 to develop a low frequency peaking signal that is multiplied by the output of threshold circuit 40 in a multiplication circuit 42. The second difference signal is also subjected to independent upper half of the active spectrum emphasis to develop the high frequency peaking signal, which is combined with the output of multiplier 42 in summer 44. The resultant horizontally processed luma signal is applied to non-linear filter and limiting arrangement 46 which tailors the minimum and maximum signals to the characteristics of the CRT.

When a comb filter is available to decode the composite video, a vertical detail component VD is conveniently obtained from its chroma output via comb switch 14 an applied to low pass filter 16. The vertical detail component VD, which is representative of the luma difference between successive pairs of horizontal lines is applied to non-linear filter and limiter arrangement 48 for similarly conforming it to the characteristics of the CRT. The vertical detail component VD is multiplied by a programmable factor and combined with the original luma signal and the resultant vertically processed luma signal is combined with the horizontally processed luma signal to form a fully processed luma signal. Finally, the fully processed luma signal is limited in a symmetrical limiter to maintain signal levels within the signal handling capability of subsequent circuitry.

What has been described is a novel digital luminance signal transient improver. It is recognized that numerous modifications and changes in the described embodiment of the invention will be apparent to those skilled in the art without departing from its true spirit and scope. The invention is to be limited only as defined in the claims.

What is claimed is:

1. A digital luminance signal processor comprising:
   a luminance signal;
   means for developing a first difference signal and a second difference signal representative of detail in said luminance signal;
   means for developing a threshold control signal in response to said second difference signal;
   means for deriving the absolute value of said first difference signal;
   means for modifying the output of said deriving means with said threshold control signal to develop a transient improved component; and
   means for combining said transient improved component, said luminance signal and said second difference signal to form a processed luminance signal.

2. The processor of claim 1 further including; high frequency peaking means;
   low frequency peaking means;
   means for modifying said second difference signal with said high frequency peaking means; and
   means for modifying said output of said deriving means with said low frequency peaking means.

3. The processor of claim 2 wherein said first difference signal and said second difference signal represent horizontal detail in said luminance signal, and further including:
   means for developing a vertical detail component representative of changes in luminance on successive lines of said luminance signal; and
   means for combining said vertical detail component with said processed luminance signal to form a fully processed luminance signal.

4. The process of claim 3, further including a comb filter for developing said vertical detail component.

5. A digital luminance signal processor comprising:
   a luminance signal;
   means for developing a first difference signal and a second difference signal representative of horizontal detail in said luminance signal;
   means for developing the absolute value of aid first difference signal;
   low frequency processing means coupled to said absolute value means for developing a low frequency peaking signal by peaking the low frequencies in said absolute value of said first difference signal;
   threshold circuit means for developing a threshold control signal in response to said second difference signal;
   high frequency processing means for developing a high frequency peaking signal by peaking the high frequencies in said second difference signal;
   means for modifying said low frequency peaking signal with said threshold control signal to develop a transient improved component; and
   means for combining said luminance signal with said transient improved component and said high frequency peaking signal to develop a horizontally processed luminance signal.

6. The processor of claim 5, further including:
   comb filter means for developing a vertical detail component representative of luminance differences between successive horizontal lines of said luminance signal; and
   means for combining said vertical detail component with said horizontally processed luminance signal to develop a fully processed luminance signal.

7. The processor of claim 6, further including:
   a pair of non-linear filters; and
   means for passing said horizontal processed luminance signal and said vertical detail component through respective ones of said non-linear filters.

8. The processor of claim 7, further including:
   a symmetrical limiter means; and
   means for passing said processed luminance signal through said symmetrical limiter means.

* * * * *